United States Patent Office 3,681,304
Patented Aug. 1, 1972

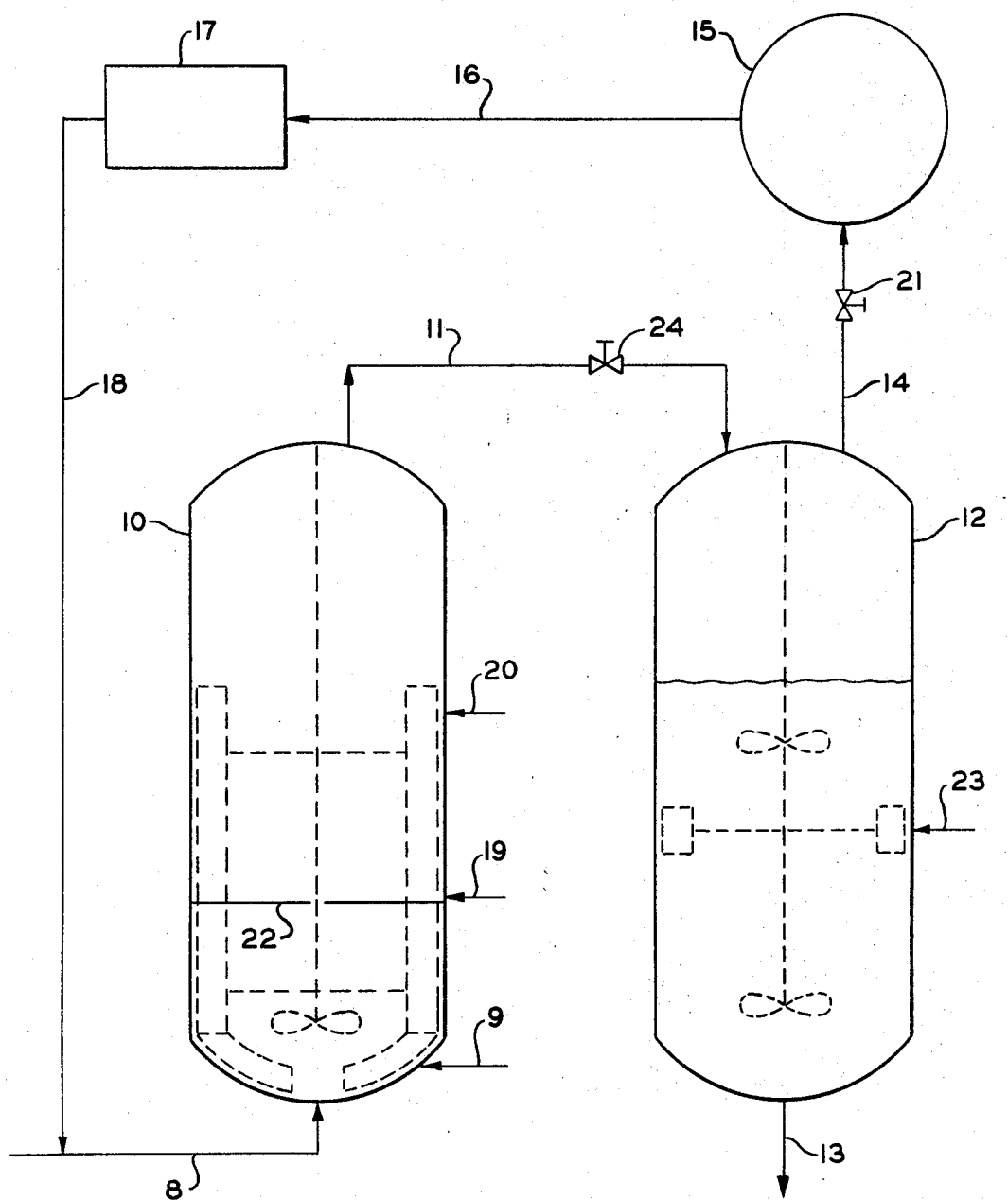

3,681,304
PROCESS FOR THE POLYMERIZATION OF
CONJUGATED DIENES
Charles R. Johnson, Akron, Ohio, assignor to The Firestone Tire & Rubber Company, Akron, Ohio
Filed July 29, 1970, Ser. No. 59,221
Int. Cl. C08d 1/04, 3/06; C08f 19/08
U.S. Cl. 260—83.7                                       9 Claims

ABSTRACT OF THE DISCLOSURE

Butadiene and/or isoprene, optionally with styrene, are polymerized continuously by introducing at least part of the monomer, hydrocarbon diluent, and a lithium based initiator into the bottom region of an elongated, vertical, pressurized reaction vessel. The materials are agitated, and additional monomer, if any, is introduced to the vessel as the materials flow from the bottom to the top of the reaction vessel, and then into a second vessel. The heat is contained within the reaction vessel. A portion of vapor is removed from the second vessel to control the pressure within it; in this manner the pressure, and hence the temperature in the reaction vessel are controlled to permit some boiling in the top of the reaction vessel. The boiling produces agitation, and the removal of vapor raises the solids content of the materials. Vapors removed are condensed and recycled, and the remaining material is discharged from the second vessel.

BACKGROUND OF THE INVENTION

This invention relates to a method of polymerizing butadiene-1,3 and/or isoprene, optionally with styrene, using a lithium based initiator.

Polymerization processes of this type, either continuous or batch processes, have encountered a number of problems. Among these are heat transfer problems, and the problem of separating diluents and unreacted monomers from the polymer. Suggested solutions to these problems have been many and varied.

Since the polymerization reaction is exothermic, heat transfer problems arise in removing heat from the polymerization zone. For this purpose reactors which are jacketed or equipped with internal cooling coils are employed. In addition to design complications, jackets or coils require a supply of coolant fluid. Additionally, heat transfer is poor when viscous polymer solutions are encountered.

Autorefrigeration has been suggested as a technique for cooling a polymerization reaction mixture. Such technique involves distilling a portion of lower boiling constituents from the mixture. However, this technique as a practical matter cannot be used whenever, as often occurs, the polymerization mixture is viscous and foams excessively upon boiling.

When diluents and unreacted monomers have been removed from the polymer, they normally contain catalyst-inactivating materials which have been added as a consequence of the physical separation of the volatile material from the polymer or to halt the polymerization reaction. These materials must be removed from the recovered diluents and unreacted monomers before the diluents and monomers can be recycled to the polymerization zone. This necessary purification of the recovered materials has usually been accomplished in monomer and diluent purification facilities, thus adding to the cost of manufacturing the polymer.

In general, prior art systems for such polymerizations have first removed heat from the system to control the reaction and then supplied heat in order to separate diluents and unreacted monomers from the polymer. Such opposing practices are necessarily wasteful.

There exists, therefore, a need for a continuous polymerization process which can avoid or minimize the various problems and undesirable practices described above.

SUMMARY OF THE INVENTION

It is an object of this invention to provide a method for continuously polymerizing monomer consisting essentially of butadiene - 1,3 and/or isoprene, optionally with styrene, which is suitable for large-scale production of polymers with a minimum of difficulty.

The invention is summarized as follows: at least part of the monomer is introduced continuously into the bottom region of an elongated, vertical, pressurized reaction vessel, along with a lithium-based initiator and an inert diluent. The introduced materials are agitated to insure intimate mixing in at least the bottom portion of the reaction vessel, and the remaining monomer, if any, is added to at least one intermediate point in the vessel. Essentially all the heat produced by the exothermic polymerization reaction remains in the reaction medium. At the top of the reaction vessel the materials continuously proceed through a line into a second vessel. A portion of the vapor present in the second vessel is removed to control the pressure in the second vessel. The pressure in the reaction vessel is thus controlled to permit boiling off of a portion of the volatile materials in the reaction vessel. As a result, the temperature in the reaction vessel is regulated; the boiling in the upper portion of the reaction vessel aids agitation; and the solids content of the materials leaving the reaction vessel is increased.

The vapor portion removed from the second vessel is continuously condensed and recycled directly to join an entering monomer stream; and the remaining materials are continuously discharged from the second vessel.

The materials discharged from the bottom of the second vessel are primarily polymer and diluent. This mixture can be further treated in a known manner to remove the diluent and add antioxidant, if desired, to convert the polymer to a commercially acceptable form.

Optionally, additional or different monomer can be added to the second vessel, in order to add a homopolymer segment to the polymer formed in the reaction vessel. Any of the monomers cited can be added for this purpose, depending on the nature of the desired segment addition.

As a further option, the reaction vessel can be equipped with a baffle, located part-way up the vessel, which minimizes vertical mixing. In this way, a segment of homopolymer or uniform copolymer can be formed from the monomer or monomers charged at the bottom of the reaction vessel, with homopolymer or copolymer segments added by subsequent monomer additions above the baffle.

A more complete understanding of the invention may be obtained by reference to the accompanying drawings, and to the following examples and detailed descriptions.

BRIEF DESCRIPTION OF THE DRAWING

The drawing shows a flow sheet, diagrammatically representing the method of the invention.

DESCRIPTION OF THE PREFERRED EMBODIMENTS OF THE INVENTION

Referring to the drawing, at least part of the monomer and a portion of the diluent are fed through line 8 into the bottom region of a reaction vessel 10. A solution of the initiator in the diluent is added through line 9. At points part way up the reactor, additional monomer is optionally added through lines 19 and 20. The mixture of polymer, liquid and vaporized diluent and unreacted monomer, if any, passes out the top of the reaction vessel 10 through line 11 into a second vessel 12. Vapor is removed from vessel 12 through a line 14 containing a pressure regulating valve 21 into a condenser 15, and the condensate is passed through line 16 into a tank 17, then through line 18, to recycle it through the system. The remaining materials in the second vessel 12 are discharged continuously through line 13 at the bottom of vessel 12 and sent for further processing (not shown).

An optional baffle 22 is shown part-way up the reaction vessel. An optional valve 24 in line 11 can be used to control material flow, if desired. Conventional turbine and scraped-surface agitators are indicated by dotted lines. Additional monomer can be added to the second vessel at point 23.

Starting materials

As previously indicated, the preferred monomers of the invention are butadiene-1,3 and/or isoprene and/or styrene. The method may be employed to produce butadiene or isoprene homopolymers, copolymers of butadiene and isoprene, copolymers of butadiene-1,3 or isoprene and styrene, or copolymers from all three monomers.

The initiator has been defined as a "lithium-based initiator." This definition includes hydrocarbon-lithium materials corresponding to the formula $R(Li)_x$, where R is an aliphatic, cycloaliphatic or aromatic hydrocarbon radical, and $x$ is an integer from 1 to 4, inclusive. The R in the formula preferably contains from 1 to 20 carbon atoms. Among the many compounds corresponding to the general formula $R(Li)_x$ are such suitable compounds as methyllithium, ethyllithium, isopropyllithium, amyllithium, hexyllithium, tert-octyllithium, n-decyllithium, cyclohexyllithium, allyllithium, methallyllithium, phenyllithium, naphthyllithium, p-tolyllithium, 4-butylphenyllithium, 4-phenylbutyllithium, dilithiomethane, 1,4-dilithiobutane, 1,10-dilithiodecane, 1,4-dilithiocyclohexane, 1,4-dilithio-2-butene, 1,4-dilithiobenzene, 1,5-dilithionaphthalene, 1,3,5-trilithiopentane, 1,3,5-trilithiocyclohexane, 1,3,5-trilithiobenzene, 1,2,3,5-tetralithiocyclohexane, 1,3,5,8-tetralithiodecane, 1,5,10,20-tetralithioeicosane, and the like. Likewise, there may be employed the lithium polynuclear aromatic hydrocarbon adducts of lithium, such as lithium-stilbene adduct. Mixtures of two or more of the above compounds or adducts can also be employed. Especially preferred is n-butyllithium.

The initiator is used at the level required to neutralize any impurities present and to produce the desired product molecular weight. Theoretically, each molecule of initiator should produce a molecule of polymer, so the initiator level should be the reciprocal of the desired molecular weight, in moles of initiator per mole of reacted monomer. Consumption of the catalyst by impurities (if any) and the possibility of chain-transfer can require an adjustment in the amount of initiator required. In general, however, from 0.001 to 1 millimole of initiator is required, per mole of monomer to be polymerized. From 0.005 to 0.5 millimole of initiator per mole of monomer is preferred.

The diluent used can be aliphatic hydrocarbons of from 4 to 10 carbon atoms or aromatic hydrocarbons of from 6 to 10 carbon atoms which are inert to the initiator employed. The diluent can be one in which the polymer is soluble, partly soluble, or the polymer can be suspended in the diluent. Materials such as pentanes, hexanes, heptanes, cyclopentane, cyclohexane, butylenes, pentenes, hexenes, heptenes, benzene, and toluene are preferred as diluents, especially hexanes. Mixtures can be used.

A modifier can be used, if desired, and the use of from 50 to 5,000 parts by weight of butadiene-1,2 per million parts of butadiene-1,3, is especially preferred for this purpose.

Charging

It has been pointed out that the incoming materials can be charged to the system in a number of ways according to the method of the invention. In addition to those materials charged at the bottom of the reaction vessel, monomer, with or without diluent, can be charged at intermediate points in the reaction vessel, and at points below the liquid surface of the second vessel. The different points of addition can be used to advantage, depending on the nature of the desired product.

The introduction of a portion of the monomer at at least one intermediate point in the reaction vessel is especially recommended when the method of the invention is used to produce copolymers from monomers having differing reaction rates, as is the case with styrene-butadiene-1,3 copolymers. The technique in this case is effective in preventing formation of block polystyrene in the polymer, an undesirable material in many end-use applications. It is hypothesized that the delayed addition of the butadiene-1,3 (the faster reacting monomer in this case) permits the copolymerization of styrene and butadiene-1,3 to occur early in the reacation period, thus avoiding the presence of styrene monomer alone in the system. Since the styrene monomer must always be accompanied by butadiene-1,3 monomer, conditions favor production of the copolymer without styrene homopolymer blocks. When either isoprene or butadiene-1,3 is the sole monomer charged, the incremental addition need not be made, and all the monomer can be charged initially, at the bottom of the reaction vessel.

In the case where it is desired to form segmented copolymers, that is those polymers containing two or more segments of homopolymer or copolymer having different monomer ratios in the molecule of polymer, differing techniques can be employed. In forming, for example, a segmented copolymer of butadiene-1,3 and styrene, either monomer can be charged first, at the bottom of the reaction vessel, and the other can be charged at a point beyond that where essentially all of the first-charged monomer has been reacted.

Similarly, a segment of honomopolymer can be added to a "constant-composition" copolymer. For example, a copolymer of styrene and butadiene-1,3 can be formed in the reaction vessel, as previously described, and a segment of styrene homopolymer added in the second vessel, by charging styrene monomer at a point beneath the liquid surface in the second vessel. The term "segmented copolymers" is employed, rather than the more commonly used term "block copolymers," since the segments are not necessarily pure homopolymer blocks. As a practical matter, any segment formed as a homopolymer would contain at least some other monomeric units, however insignificant. Also, it may be desired to form a segment which is a constant-composition copolymer from two or more monomers.

Addition of initiator is preferably made in a dispersion or solution in the diluent, with sufficient diluent to permit fast mixing and approach a perfect dispersion of the initiator in the monomer mixture. At least one-fifth, and preferably one-third or more of the total diluent charged can advantageously be added as the initiator dispersant or solvent.

The temperature of all the materials charged is controlled by cooling or heating them, by means of heat-exchangers, as required. Since the temperature of these materials will affect the initial polymerization rate, as well as the heat contained in the entire system, temperature control of charged material is important. The materials can be charged at temperatures varying from −50° C. to +150° C., and are often charged at ambient temperature. All materials can be charged at the same temperature, or the temperatures of different streams may differ.

Polymerization conditions

The reaction vessel 10 is elongated and vertical. This configuration facilitates the smooth upward flow of the charged materials from the bottom to the discharge region at the top. In order to obtain such flow, without excessive top-to-bottom displacement by the agitation, the reaction vessel should have a vertical height which is at least 1.5 times its diameter, and preferably at least twice its diameter. Any upper limitation on the height-to-diameter ratio is imposed only by practical considerations of obtaining adequate agitation and entry into the vessel for cleaning purposes.

Agitation in both vessels 10 and 12 should be provided, especially in the reaction vessel 10. At the bottom of reaction vessel 10 a thorough rapid mixing of the entering materials is quite important to insure against uncontrolled polymerization, either at too fast or too slow a rate. A so-called "scraped-surface" agitator is preferably employed, at least in those regions where monomer or other materials are being added, to avoid "dead spots" at the vessel walls. At the bottom of the reaction the mixture contains a relatively low proportion of polymer to diluent, thus is quite fluid and conducive to good mixing. Staged turbine agitators are sufficient for adequate mixing in other regions of the two vessels. Since vertical mixing is minimized with scraped-surface agitation, its use is especially preferred in the reaction vessel.

Exclusion from the process of materials harmful to the lithium-based initiator is especially important. These materials include water, oxygen, carbon dioxide and other similar materials which "kill," or de-activate the initiator. The incoming monomers and diluent are preferably treated to remove such impurities.

Temperatures utilized in the method of the invention should be generally at a relatively high level, compared with prior art processes. The higher temperatures contribute to the fluidity of the mixture of polymer and diluent and improve reaction rates. A temperature profile of the reaction vessel shows that the bottom region of the vessel is at the lowest temperature, preferably from about 30° C. up to 120° C. As the entering materials are combined, the polymerization reaction is quite rapid, and the heat of polymerization raises the temperature of the materials quickly.

Temperatures then increase as the reaction of initially and/or additionally charged monomer progresses to completion and the mixture flows upwards through the reactor. Near the top of the reaction vessel 10 almost all the materials charged to the vessel have reacted, and the temperature reaches a peak of about 90° C. up to about 160° C. or higher. As the peak temperature reaches the boiling point of the volatile materials in the mixture, vaporization of a portion of the volatiles effectively limits the temperature thus providing reaction control by auto-refrigeration.

Although heat can be removed from reaction vessel 10 if desired by means of a jacket or cooling coils, the amount of heat removed would be small because of the high viscosity and poor heat transfer of the reaction mixture. The method of the invention is designed to work most advantageously if substantially no heat is removed from the vessels 10, 12 and line 11, thus avoiding the heat transfer problems associated therewith. In addition, the retention of the heat of reaction within the vessels allows this heat to be used as a driving force in removing diluent from the polymer mixture. As an added advantage, the boiling of the mixture near the top of the vessel 10 provides agitation in that region of vessel 10 where the mixture is most viscous. Insulation of vessels 10 and 12 and the connecting line can be provided, if desired, to improve heat retention in the system.

As indicated above, the control of the pressure in the method of the invention is quite important. Control is basically accomplished by regulation of valve 21 in line 14 between the second vessel and the condenser (which valve can be regulated automatically or manually) to permit removal of sufficient vapor from the second vessel 12 to control the pressure therein as desired. The line connecting the two vessels can be equipped with a valve, to allow the pressure differential between the vessels to be increased. The method is advantageously performed, however, without such a valve, or with the valve usually fully open. In this preferred mode, the pressure differential between the vessels is slight, on the order of as little as 0.01 atmosphere, caused by fluid friction. Differentials up to 3 atmospheres or higher can be employed, if desired. A preferred differential range is from about 0.1 to 1 atmosphere.

The reaction vessel is normally maintained essentially completely full of liquid, although vaporization of the volatile materials occurs in the upper portion of the reaction vessel to the extent desired by establishing its pressure with consideration being given to the relationships of temperature and partial pressures of the volatiles. The second vessel is preferably only partially filled with the liquid materials, with a vapor space in the top portion permitting removal of vapor near the top without entrainment of the liquid.

The vapors removed from the top of the second vessel contain diluent, unreacted monomers, if any, and a portion of a modifier material, if it is used. These vapors are liquified by cooling, and are then recycled directly to join an entering monomer stream, either at the bottom of the reaction vessel or at another introduction point.

The materials leaving the bottom of the second vessel can be subjected to further operations to remove the remaining volatile materials, in any of a number of known systems. The polymers recovered can be employed in the manufacture of tires, belts, hose or other products. In the final steps of recovering the polymers it is customary to add an antioxidant to protect the polymer. In their end use, the polymers are normally compounded with vulcanizing ingredients, carbon black and other known rubber-compounding materials.

The method of the invention may be better understood by reference to the following examples, in which all parts and percentages are by weight, unless otherwise indicated.

EXAMPLE I

A stream of dried and purified butadiene-1,3 was passed through a heat-exchanger to bring it to approximately 15° C., then separated into three streams. One of the three streams, carrying about one half of the total butadine-1,3 charged, was injected with enough butadiene-1,2 to provide 500 parts per million of butadiene-1,2, based on the total charge of butadiene-1,3. This butadiene stream joined a stream of purified styrene and commercial hexane, and the combined stream was heated to about 30° C. and introduced into the bottom region of a reaction vessel whose height was approximately three times its diameter. For start-up, the reaction vessel was charged about one-quarter full with hot hexane (120° C.). At another point near the bottom of the reaction vessel, a solution of an n-butyllithium initiator in hexane was also added. The reaction vessel was equipped with a "scraped-surface" agitator which provided excellent agitation especially in the region of initiator addition.

As the charged materials were quickly mixed the polymerization reaction began immediately, maintaining the temperature of the mixture close to that of the hot hexane initially present (120° C.). One of the two separated streams of butadiene-1,3 monomer was injected into the reaction vessel at a point about ⅓ of the way up the vessel wall, and the remaining stream at a point about ⅔ of the way up. The charged monomers totaled about 22% of the total materials.

After the reaction came to equilibrium, the temperature in the lower portion of the reaction vessel was about 110° C.; at the mid-point about 115° C.; and at the top, about 120° C. A slight amount of boiling-off of butadiene and more hexane occurred near the top of the reaction vessel, where the temperature was highest and the fluid head the least.

The materials left the top of the reaction vessel as a viscous "cement" of polymer dissolved and/or suspended in the diluent. At the concentration and temperature employed, some phase separation of the reaction mixture occurred, and the materials flowed through a line into the top of the second vessel in "plugs" of viscous cement, separated by pockets of vapor, and lubricated by the separated hexane. Only a small degree of foaming was noted as the materials fell into the second vessel, maintained about ½ full of liquid. The pressure in the second vessel was maintained at approximately six atmospheres, about one-half atmosphere lower than that in the reaction vessel. The difference in pressure represented the pressure drop in the connecting line. Control of the pressure was maintained by removing vapor from the top of the second vessel. The vapors, which contained about 4% of the butadiene-1,3 charged, were condensed, cooled, and recycled to the bottom of the reaction vessel.

The mixture of polymer and volatiles which entered the second vessel at a polymer content of 22% was removed from the bottom of the second vessel at a polymer content of 25%. Thus, approximately 15.5% of the diluent, along with 4% of the butadiene-1,3, was removed from the second vessel, and recycled directly to the reaction vessel.

The mixture of polymer and the remaining diluent was removed from the bottom of the second vessel and subjected to further drying operations to remove the rest of the volatiles. The recovered polymer contained 20% bound styrene, but essentially no block polystyrene.

A portion of the effluent from the second vessel was held at 125° C. for 60 hours without an increase in the viscosity of the contained polymer, indicating that no further reaction occurred, despite the fact the effluent had not been treated to "kill" the catalyst.

Equivalent results are obtained by substituting for a portion or all of the n-butyllithium initiator equivalent amounts of the alternative organolithium initiators.

EXAMPLE II

The procedure of Example I was repeated, except that the only monomer employed was butadiene-1,3, which was all charged at the bottom of the reaction vessel. Thus no separate monomer streams were injected. The recovered polybutadiene was compounded in a tire-tread formulation and performed well in tire tests.

Equivalent results are obtained by substituting pentanes, heptanes, benzene, toluene, and cyclohexane for hexane as the diluent.

EXAMPLE III

The procedure of Example I is repeated, except that the monomers charged initially are styrene and isoprene. Butadiene-1,3 is added at one of the intermediate points in the reaction vessel. The recovered polymer is a copolymer of isoprene, styrene and butadiene.

EXAMPLE IV

The procedure of Example I is repeated, except that the only monomer charged initially at the bottom of the reaction vessel is styrene. The reaction vessel is equipped with a horizontal baffle just below the lower injection point for butadiene-1,3. Additionally, more styrene monomer is charged in the second vessel. The polymer recovered is a three-segment copolymer of the composition: styrene-butadiene-styrene. This polymer is thermoplastic, and gives good results in injection-molding applications.

EXAMPLE V

The procedure of Example IV is repeated, except that instead of butadiene-1,3, isoprene is charged above the baffle. The recovered polymer is a styrene-isoprene-styrene three-segment copolymer.

I claim:

1. The method of polymerizing monomer consisting essentially of butadiene-1,3 and/or isoprene, optionally with styrene, comprising the steps of
    continuously introducing into the bottom region of an elongated, vertical, pressurized reaction vessel at least part of the monomer, a hydrocarbon diluent at a rate, relative to the total monomer charge rate, sufficient to produce a fluid solution or suspension of the polymer formed, and an initiator which is a lithium polynuclear aromatic hydrocarbon adduct or a compound corresponding to the formula $R(Li)_x$, where R is an aliphatic, cycloaliphatic or aromatic hydrocarbon radical of from 1 to 20 carbon atoms and $x$ is an integer from 1 to 4 inclusive, at a rate of from 0.001 to 1 millimole per mole of total monomer charge rate,
    agitating the introduced materials to insure intimate mixing in at least the bottom portion of the reaction vessel, and continuously adding the remaining monomer, if any, at at least one intermediate point in the reaction vessel, while containing essentially all the heat produced by the exothermic polymerization reaction within the reaction vessel,
    allowing the materials to flow continuously from the top of the reaction vessel into a second vessel,
    removing at least a portion of the vapor from the second vessel to control the pressure in the second vessel at from 0.01 to 3 atmospheres less than the vapor pressure of the volatiles at the top of the reaction vessel, thereby controlling the pressure in the reaction vessel so as to permit boiling off a portion of the volatile materials in the reaction vessel, whereby the temperature at the top of the reaction vessel is controlled at from about 90° C. up to about 160° C., the upper portion of the reaction vessel is agitated, and the solids content of the mixture is increased,
    condensing the vapor, and recycling the condensate to the reaction vessel,
    and continuously discharging the remaining materials from the second vessel.

2. The method of claim 1, wherein the monomer is butadiene-1,3.

3. The method of claim 1, wherein the monomer consists of butadiene-1,3 and styrene.

4. The method of claim 3, wherein the polymer produced is a substantially uniform copolymer of butadiene-1,3 and styrene.

5. The method of claim 1, wherein the initiator is n-butyllithium.

6. The method of claim 1, wherein the hydrocarbon diluent is n-hexane or a mixture of hexanes.

7. The method of claim 1, wherein additional monomer is added to the second vessel at a point below the liquid level.

8. The method of claim 7, wherein the part of the monomer introduced into the bottom of the reaction vessel is styrene, the remaining monomer charged into the reaction vessel at one intermediate point is butadiene-1,3, and the additional monomer added to the second vessel is styrene.

9. The method of claim 7, wherein the part of the monomer introduced into the bottom of the reaction vessel is styrene, the remaining monomer charged into the reaction vessel at one intermediate point is isoprene and the additional monomer added to the second vessel is styrene.

References Cited

UNITED STATES PATENTS

| | | | |
|---|---|---|---|
| 3,297,793 | 1/1967 | Dollinger | 260—95 C |
| 3,458,490 | 7/1969 | Irvin et al. | 260—94.2 M |
| 3,461,109 | 8/1969 | Hinton et al. | 260—94.2 |
| 3,558,575 | 1/1971 | Keckler | 260—83.7 |
| 3,513,145 | 5/1970 | Crawford | 260—95 |

JAMES A. SEIDLECK, Primary Examiner

U.S. Cl. X.R.

260—82.1, 94.2 M, 95 C, 880 B